(12) United States Patent
Tseng et al.

(10) Patent No.: US 11,910,716 B1
(45) Date of Patent: Feb. 20, 2024

(54) ULTRASONIC SENSOR SYSTEM AND MULTI-LAYER STIFFENER FOR FOLDABLE DISPLAY

(71) Applicant: QUALCOMM Incorporated, San Diego, CA (US)

(72) Inventors: Chin-Jen Tseng, Fremont, CA (US); Jessica Liu Strohmann, Cupertino, CA (US); Ila Badge, San Jose, CA (US); Shiang-Chi Lin, Taoyuan (TW); Min-Lun Yang, Miaoli County (TW); Hrishikesh Vijaykumar Panchawagh, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/163,714

(22) Filed: Feb. 2, 2023

(51) Int. Cl.
  *G06V 40/13* (2022.01)
  *H10N 30/00* (2023.01)
  *H10K 59/90* (2023.01)
  *G06V 40/12* (2022.01)
  *H10N 39/00* (2023.01)

(52) U.S. Cl.
  CPC ............... *H10N 30/10516* (2023.02); *G06V 40/1306* (2022.01); *G06V 40/1347* (2022.01); *H10K 59/90* (2023.02); *H10N 39/00* (2023.02)

(58) Field of Classification Search
  None
  See application file for complete search history.

(56) References Cited

U.S. PATENT DOCUMENTS

| 2023/0071578 | A1* | 3/2023 | Sim | B32B 15/09 |
| 2023/0140335 | A1* | 5/2023 | Ahn | B32B 3/08 |
| | | | | 361/679.01 |
| 2023/0251691 | A1* | 8/2023 | Kim | G06F 1/1637 |
| | | | | 361/679.01 |

* cited by examiner

*Primary Examiner* — Joseph R Haley
(74) *Attorney, Agent, or Firm* — QUALCOMM Incorporated

(57) ABSTRACT

An apparatus includes an ultrasonic sensor stack, a foldable display stack that includes a display stiffener, and an additional stiffener between the ultrasonic sensor stack and the foldable display stack. The additional stiffener forms an acoustic resonator with the display stiffener and an adhesive layer between the display stiffener and the additional stiffener in order to amplify transmission of ultrasonic waves transmitted by the ultrasonic sensor stack. The additional stiffener includes a material having a high modulus of elasticity, low density, and high acoustic impedance value. In some cases, the additional stiffener includes a metal, a ceramic, a glass, or a glass ceramic. The additional stiffener increases an overall stiffness and mechanical integrity of the apparatus so that a foam backer may be omitted from the ultrasonic sensor stack.

23 Claims, 8 Drawing Sheets

ULTRASONIC SENSOR SYSTEM AND MULTI-LAYER STIFFENER FOR FOLDABLE DISPLAY

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This disclosure relates generally to sensor devices and related methods, including but not limited to ultrasonic sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic sensor stack configured to transmit and receive ultrasonic waves, a foldable display stack comprising a first stiffener, a second stiffener between the ultrasonic sensor stack and the foldable display stack, and a first adhesive layer between the second stiffener and the first stiffener. An acoustic resonator is formed by at least the first stiffener, the second stiffener, and the first adhesive layer, and is configured to amplify transmission of the ultrasonic waves transmitted by the ultrasonic sensor stack.

In some implementations, each of the first stiffener and the second stiffener has a Young's modulus greater than about 10 GPa. In some implementations, each of the first stiffener and the second stiffener has an acoustic impedance value greater than about 8.0 MRayls. In some implementations, the ultrasonic sensor stack comprises a TFT layer having a substrate and an array of sensor pixels, an ultrasonic transceiver layer coupled to the TFT layer and comprising a piezoelectric material, and an electrode layer coupled to the ultrasonic transceiver layer. In some implementations, the first stiffener comprises a metal or a plastic layer. In some implementations, the second stiffener comprises a metal. In some implementations, the metal is selected from a group consisting of: aluminum, stainless steel, titanium, nickel, and alloys thereof In some implementations, the second stiffener comprises glass. In some implementations, the second stiffener comprises ceramic. In some implementations, the second stiffener comprises aluminum oxide. In some implementations, the second stiffener comprises a glass ceramic. In some implementations, the second stiffener comprises a plastic. In some implementations, the apparatus further includes an electrically conductive layer between the second stiffener and the ultrasonic sensor stack, where the acoustic resonator is formed by at least the first stiffener, the second stiffener, the first adhesive layer, and the electrically conductive layer. In some implementations, the apparatus further includes a second adhesive layer between the electrically conductive layer and the second stiffener, and a third adhesive layer between the electrically conductive layer and the ultrasonic sensor stack. In some implementations, the ultrasonic sensor stack is without any foam backer. In some implementations, the second stiffener is configured to reduce mechanical stresses in the foldable display stack and the ultrasonic sensor stack.

Other innovative aspects of the subject matter described in this disclosure may be implemented in an apparatus. The apparatus may include an ultrasonic sensor stack configured to transmit and receive ultrasonic waves, a foldable display stack comprising a first stiffener, a second stiffener between the ultrasonic sensor stack and the foldable display stack, and a first adhesive layer between the second stiffener and the first stiffener. A multi-layer stiffener is formed by at least the first stiffener, the second stiffener, and the first adhesive layer, where each of the first stiffener and the second stiffener has a Young's modulus greater than about 10 GPa, and an acoustic impedance value of greater than about 8.0 MRayls.

In some implementations, the first stiffener comprises and metal and has a thickness in a range from 30 microns to 300 microns. In some implementations, the second stiffener layer comprises a material selected from a group consisting of: a metal, a ceramic, a glass, and a glass ceramic.

Other innovative aspects of the subject matter described in this disclosure may be implemented in a method. The method may include controlling, via a control system, an ultrasonic transceiver layer of an ultrasonic sensor stack to transmit ultrasonic waves through at least a multi-layer stiffener and one or more display stack layers of a foldable display, the multi-layer stiffener including a first stiffener layer of the foldable display, a second stiffener layer, and an adhesive layer between the first and second stiffener layer, and receiving, by the control system and from the ultrasonic sensor stack, ultrasonic sensor signals corresponding to reflections of transmitted ultrasonic waves from a portion of a target object positioned on an outer surface of an apparatus that includes the ultrasonic sensor stack. The method further includes performing, by the control system, an authentication process based, at least in part, on the ultrasonic sensor signals.

In some implementations, the local maximum of ultrasonic wave transmission corresponds to a frequency in a range from 1 MHz to 20 MHz. In some implementations, the authentication process involves extracting target object features from the ultrasonic sensor signals. In some implementations, the target object features include at least one of fingerprint features or sub-epidermal features.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
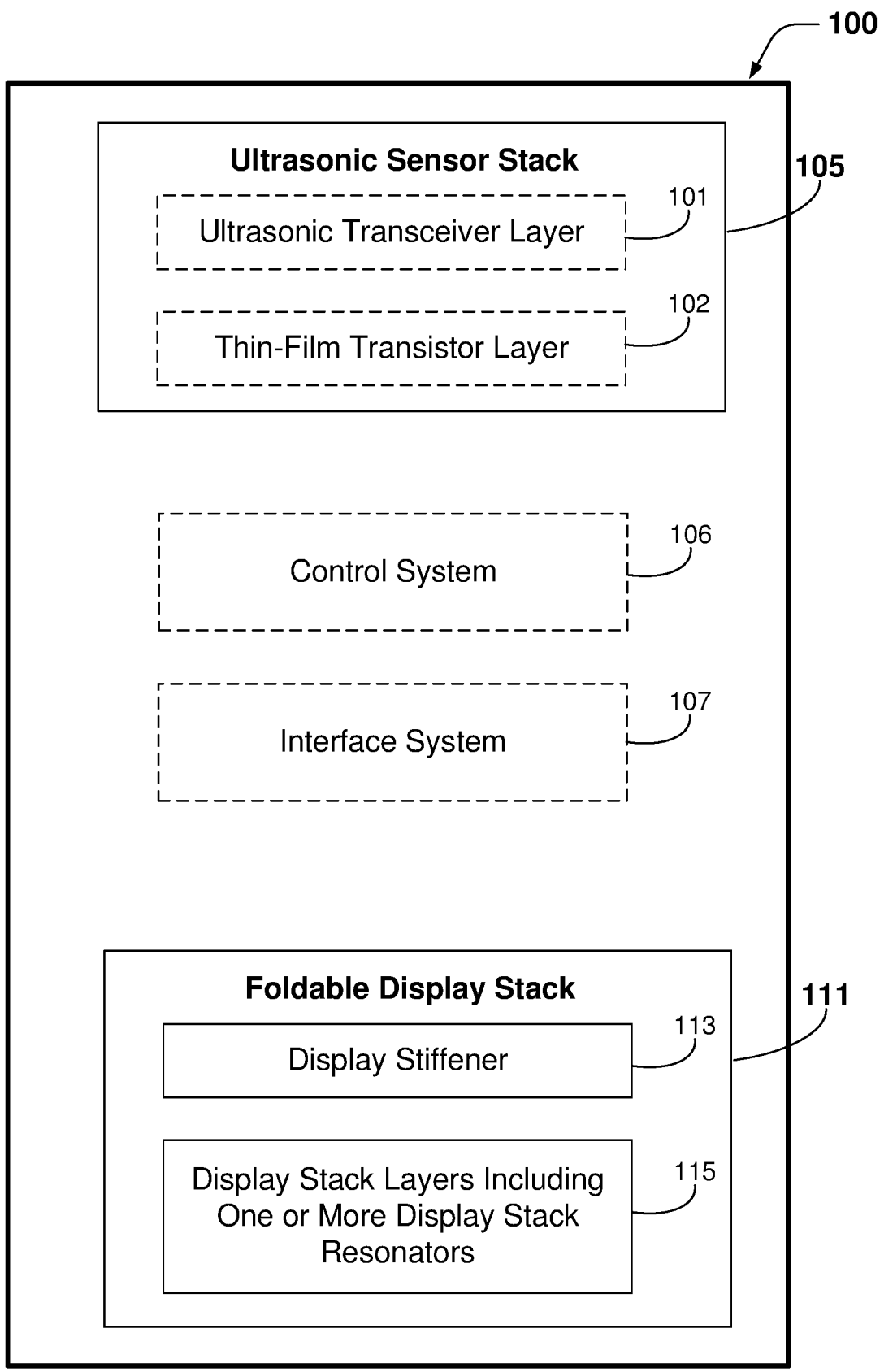
FIG. 1 is a block diagram that shows example components of an apparatus including a foldable display stack and an ultrasonic sensor stack.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Fingerprint sensor systems may be useful and effective in authenticating users to electronic devices. Capacitive-based fingerprint sensors may require electromagnetic signals that can interfere with the electrical functions of the display. Signals generated or transferred within the display along with associated conductive traces may reduce capacitive fingerprint-sensing capability. Optical-based fingerprint systems may be limited or rendered useless where display devices include a light-blocking layer or a large number of metal traces. Ultrasonic-based fingerprint sensors use ultrasonic waves to produce a detailed reproduction of a scanned fingerprint. An ultrasonic-based fingerprint sensor for fingerprint scanning may be incorporated in a display device. Ultrasonic-based fingerprint sensors may be incorporated "under display" or "in display" so that fingerprint scans may be performed in a display area.

It is challenging to design an under-display ultrasonic sensor system that provides acceptable performance. However, the present assignee has successfully designed under-display ultrasonic sensor systems that are widely deployed in cell phones and other display devices. Some such display devices include flexible or foldable display devices. For instance, a foldable display device may include a flexible organic light-emitting diode (OLED) display device.

Designing an under-display ultrasonic sensor system for foldable display devices presents additional challenges. A foldable display typically includes a display stiffener, which helps to maintain the physical integrity of the display stack when the foldable display is folded and unfolded. The display stiffener is usually made from metal having a thickness in the range of approximately 30 microns to 300 microns, though display stiffeners also may be formed of other material(s) having a relatively high modulus of elasticity and may, in some instances, have other thicknesses. Display stiffeners may severely attenuate ultrasonic waves in frequency ranges that are suitable for ultrasonic fingerprint sensors.

An under-display ultrasonic sensor stack may be provided in the foldable display device having the display stiffener. However, the display stiffener may not be sufficient to maintain the physical integrity of both the display stack and the ultrasonic sensor stack. A foam backer or foam backing layer is ordinarily incorporated with the ultrasonic sensor stack of the foldable display device for improved mechanical integrity and support. Yet incorporation of the foam backer can lead to random image artifacts and reduced device performance.

A display device of the present disclosure may be provided with a multi-layer stiffener. The display device may include a foldable display stack having one or more display layers and a display stiffener. The display device may further include an ultrasonic sensor stack and a device stiffener between the ultrasonic sensor stack and the foldable display stack. The device stiffener, the display stiffener, and an adhesive layer between the device stiffener and the display stiffener may collectively form an acoustic resonator configured to enhance ultrasonic waves transmitted by the ultrasonic sensor stack. The device stiffener may include a material having a high modulus of elasticity, a low density, and a high acoustic impedance. In some implementations, the device stiffener may include a material selected from a group consisting of: a metal, a glass, a ceramic, and a glass ceramic. The ultrasonic sensor stack may be oriented in a "receiver up" or "receiver down" orientation, and the ultrasonic sensor stack may include an ultrasonic transceiver in some implementations, or an ultrasonic transmitter separate from an ultrasonic receiver in some other implementations.

Particular implementations of the subject matter described in this disclosure may be implemented to realize one or more of the following potential advantages. The multi-layer stiffener in the display device improves the display stack stiffness. The improved display stack stiffness eliminates or reduces sensor marks. Sensor marks are presented as cosmetic defects during imaging, which may be caused by lamination of the ultrasonic sensor. In addition, integration of the multi-layer stiffener eliminates the foam backer, thereby eliminating random image artifacts caused by the presence of the foam backer. The presence of the foam backer may cause air-in-capture (AIC) issues during image capture. This means that the air-in-capture image (at zero force) is different than the true background image with display deformation (at finger press force). Omission of the foam backer from the display device improves image quality and display reliability. The presence of the multi-functional stiffener makes the display stronger with less deformation, thereby making the air-in-capture image closer to the true background image with display deformation. The multi-layer stiffener also acts as an acoustic resonator configured to amplify ultrasonic waves transmitted by an ultrasonic sensor stack in an ultrasonic frequency range that is suitable for ultrasonic sensors. This further improves image quality and improves sensor performance. Implementations where the multi-layer stiffener resides between the ultrasonic sensor stack and display stack may be manufactured without modifying the existing foldable display stack, thereby avoiding additional manufacturing cost and time.

FIG. 1 is a block diagram that shows example components of an apparatus including a foldable display stack and an ultrasonic sensor stack. As with other disclosed implementations, the numbers, types and arrangements of elements shown in FIG. 1 are merely presented by way of example. Although not shown in FIG. 1, the apparatus 100 may include other components, such as a cover (which may be, or may include, a cover glass), one or more adhesive layers, one or more electrode layers, etc. Some examples are described below. In some implementations, the apparatus 100 may be a mobile device that includes the elements shown in FIG. 1.

According to this example, the apparatus 100 includes an ultrasonic sensor stack 105. The ultrasonic sensor stack 105 is configured to transmit and receive ultrasonic waves. In some examples, the ultrasonic sensor stack 105 includes an ultrasonic transceiver layer 101 and a thin-film transistor (TFT) layer 102. The TFT layer 102 may include a TFT substrate and an array of sensor pixels. In some examples, the ultrasonic transceiver layer 101 may be configured to function as both an ultrasonic transmitter and an ultrasonic receiver. According to some implementations, the ultrasonic transceiver layer 101 may be a single piezoelectric layer.

According to some other implementations, the ultrasonic transceiver layer 101 may be a multi-layer piezoelectric structure, or an array of such structures. For example, the ultrasonic transceiver layer 101 may include an ultrasonic transmitter layer separate from an ultrasonic receiver layer.

In some implementations, the ultrasonic transceiver layer 101 may include a piezoelectric layer, such as a layer of PVDF polymer or a layer of PVDF-TrFE copolymer. In some implementations, other piezoelectric materials may be used in the ultrasonic transceiver layer 101, such as aluminum nitride (AlN) or lead zirconate titanate (PZT). Some alternative implementations may include separate ultrasonic transmitter and ultrasonic receiver layers.

The ultrasonic transceiver layer 101 may, in some alternative examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

The TFT layer 102 may be a type of metal—oxide—semiconductor field-effect transistor (MOSFET) made by depositing thin films of an active semiconductor layer as well as a dielectric layer and metallic contacts over a TFT substrate. In some examples, the TFT substrate may be a non-conductive material such as glass. According to some implementations, the TFT layer 102 may have a thickness that is in the range of 50 microns to 400 microns.

In this implementation, the apparatus includes a foldable display stack 111. According to this example, the foldable display stack 111 includes a display stiffener 113 and display stack layers 115. The display stack layers 115 may, in some examples, include layers of a light-emitting diode (LED) display, such as an organic light-emitting diode (OLED) display. Some examples of display stack layers 115 are provided in this disclosure.

In this example, the display stack layers 115 form one or more display stack resonators. The display stack resonator(s) may, in some examples, be configured to enhance ultrasonic waves transmitted by the ultrasonic sensor stack in a first ultrasonic frequency range. In some examples, the one or more display stack resonators may include a first resonator bounded by the display stiffener 113 and a glass layer of the display stack layers 115. In some such examples, the first resonator may include a plurality of layers of an organic light-emitting diode display. In some examples, the one or more display stack resonators may include a second resonator bounded by the glass layer and an outer surface of the foldable display stack.

In some examples, the display stiffener 113 may have a relatively high acoustic impedance, e.g., an acoustic impedance of 10 MRayls or more. In some implementations, the display stiffener 113 may be, or may include, a metal layer. Such a metal layer may include a stainless steel layer having an acoustic impedance of approximately 47 MRayls or an aluminum layer having an acoustic impedance of approximately 17 MRayls. However, in other implementations the display stiffener 113 may be, or may include, one or more other metals, or non-metal material (e.g., plastic) having a relatively high modulus of elasticity. According to some examples, the display stiffener 113 may have a thickness in the range of 30 microns to 300 microns. According to some examples, the display stiffener 113 may have a thickness corresponding to a multiple of a half wavelength of a shear wave or a longitudinal wave having a frequency in a second ultrasonic frequency range that is higher than the first ultrasonic frequency range.

In some examples, the apparatus 100 may include a control system 106. The control system 106 (when present) may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. The control system 106 may be capable of receiving and processing data from the ultrasonic transceiver layer 101 and/or from an array of sensor pixels, e.g., as described below. In some implementations, functionality of the control system 106 may be partitioned between one or more controllers or processors, such as a dedicated sensor controller and an applications processor of a mobile device.

Some implementations of the apparatus 100 may include an interface system 107. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 107 may be configured to provide communication (which may include wired or wireless communication, such as electrical communication, radio communication, etc.) between components of the apparatus 100. In some such examples, the interface system 107 may be configured to provide communication between the control system 106 and the ultrasonic transceiver layer 101, to provide communication between the control system 106 and one or more of the display stack layers 115, and/or to provide communication between the control system 106 and an array of sensor pixels. According to some such examples, a portion of the interface system 107 may couple at least a portion of the control system 106 to the ultrasonic transceiver layer 101 and/or an array of sensor pixels, e.g., via electrically conducting material.

According to some examples, the interface system 107 may be configured to provide communication between the apparatus 100 and other devices and/or human beings. In some such examples, the interface system 107 may include one or more user interfaces. The interface system 107 may, in some examples, include one or more network interfaces and/or one or more external device interfaces (such as one or more universal serial bus (USB) interfaces). In some implementations, the apparatus 100 may include a memory system. The interface system 107 may, in some examples, include at least one interface between the control system 106 and a memory system.

The apparatus 100 may be used in a variety of different contexts, many examples of which are disclosed herein. For example, in some implementations a mobile device, such as a cell phone, a smart phone, a tablet, a laptop (e.g., a laptop touchpad), etc., may include at least a portion of the apparatus 100. In some implementations, a wearable device may include at least a portion of the apparatus 100. The wearable device may, for example, be a watch, a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone or a tablet computer) and/or a server. The interface system 107 also may, in some such examples, reside in more than one device.

Figure 2:
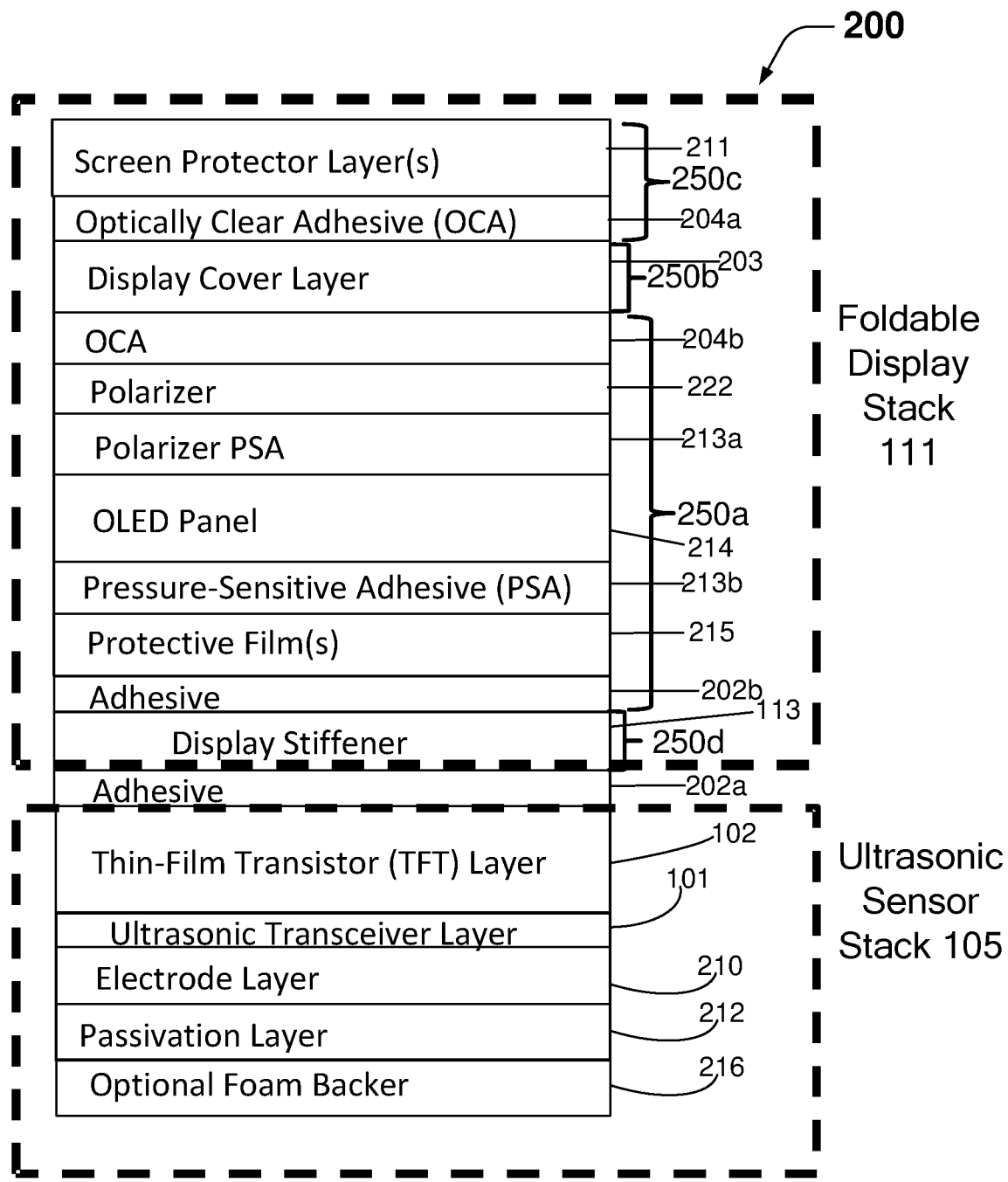
FIG. 2 shows a cross-sectional schematic view of an example apparatus including a foldable display stack and an ultrasonic sensor stack.

FIG. 2 shows a cross-sectional schematic view of an example display device including a foldable display stack and an ultrasonic sensor stack. The types, number and arrangement of elements shown in FIG. 2 are merely examples. Other examples may include different types, numbers and/or arrangements of elements. Moreover, the elements shown in FIG. 2 are not drawn to scale.

The apparatus 200 is similar to the apparatus 100 shown in FIG. 1. The apparatus 200 includes instances of the ultrasonic sensor stack 105 and of the foldable display stack 111 of FIG. 1. Here, the ultrasonic sensor stack 105 is attached to the foldable display stack 111 via an adhesive layer 202*a*. The adhesive layer 202*a* may be, or may include, a pressure-sensitive adhesive (PSA). In some instances, the adhesive layer 202*a* may be in the range of 2 microns to 10 microns.

The ultrasonic sensor stack 105 includes a TFT layer 102, an ultrasonic transceiver layer 101 and an electrode layer 210. The TFT layer 102 resides between the ultrasonic transceiver layer 101 and the foldable display stack 111, and the adhesive layer 202*a* connects the TFT layer 102 to the foldable display stack 111. In some alternative examples, the ultrasonic transceiver layer 101 may reside between the TFT layer 102 and the foldable display stack 111. The ultrasonic transceiver layer 101 may be, or may include, one or more piezoelectric materials, such as a piezoelectric polymer and/or a piezoelectric copolymer. The electrode layer 210 may be, or may include, an electrically conductive material such as a conductive ink. For example, the electrically conductive material may include silver ink. In this instance, the ultrasonic sensor stack 105 includes a passivation layer 212. The passivation layer 212 may be, or may include, an epoxy film.

The ultrasonic sensor stack 105 may optionally further include a foam backer 216. The foam backer 216 may be located at the bottom or back of the apparatus 200. The foam backer 216 may be underlying the passivation layer 212 of the ultrasonic sensor stack 105. In some implementations, the foam backer 216 may be composed of a soft flexible material. In some implementations, the foam backer 216 may be porous. The foam backer 216 at the back of the apparatus 200 may provide a mechanical cushion or support. This provides structural support and protection for the ultrasonic sensor stack 105. In some cases, the foam backer 216 may have an acoustic impedance very close to air in order to provide total or near-total reflection of propagating ultrasonic waves.

The foldable display stack 111 includes a display stiffener 113 that resides between the TFT layer 102 and the other layers of the foldable display stack 111. The display stiffener 113 provides structural support for the other layers of the foldable display stack 111. In some examples, the display stiffener 113 may be, or may include, a high-impedance material (in other words, a material having a high acoustic impedance) such as a metal.

The foldable display stack 111 includes one or more screen protector layers 211, which may include a polyethylene terephthalate (PET) layer in some instances. The foldable display stack 111 includes a display cover layer 203, a polarizer layer 222, an OLED panel 214 and one or more layers of protective film 215. The display cover layer 203 may include a glass, plastic, or other transparent material. Here, an optically clear adhesive (OCA) layer 204a connects the one or more screen protector layers 211 to the display cover layer 203 and an OCA layer 204b connects the display cover layer 203 to the polarizer layer 222. A polarizer pressure-sensitive adhesive 213a connects the polarizer 222 to the OLED panel 214 and a pressure-sensitive adhesive 213b connects the OLED panel 214 to the one or more layers of protective film 215. The polarizer pressure-sensitive adhesive 213a may, for example, be an optically clear adhesive (OCA).

In this example, the adhesive layer 202b and layers of the foldable display stack 111 form the resonator 250a, which is bounded by the display cover layer 203 and the display stiffener 113. According to this example, the resonator 250a includes the OCA layer 204b, the polarizer layer 222, the polarizer pressure-sensitive adhesive 213a, the OLED panel 214, the pressure-sensitive adhesive 213b, the one or more layers of protective film 215 and the adhesive layer 202b. In some examples, the thickness of the resonator 250a may correspond to a multiple N of a half wavelength at a peak frequency of an ultrasonic frequency range of ultrasonic waves transmitted by the ultrasonic sensor stack 105, where N is an integer greater than or equal to 1. In some such implementations, the resonator 250a may cause a local maximum within the ultrasonic frequency range. According to some examples, the local maximum may correspond to a frequency in the range from 5 MHz to 15 MHz, or from 1 MHz to 20 MHz. According to some such implementations, a frequency range that includes the local ultrasonic wave transmission maximum caused by the resonator 250a may correspond with a frequency range that includes a local ultrasonic wave transmission maximum caused by the resonator 250c.

According to this example, the foldable display stack 111 also includes the resonator 250c, which is formed by the one or more screen protector layers 211 and the OCA 204a, and is bounded by the display cover layer 203: here, the display cover layer 203 has a higher acoustic impedance than that of the one or more screen protector layers 211 or the OCA 204a. In some examples, the thickness of the resonator 250c may correspond to a multiple N of a quarter wavelength at a peak frequency of an ultrasonic frequency range of ultrasonic waves transmitted by the ultrasonic sensor stack 105, where N is an integer greater than or equal to 1. In some such implementations, the resonator 250c may cause a local maximum within the ultrasonic frequency range. According to some examples, the local maximum may correspond to a frequency in the range from 5 MHz to 15 MHz, or from 1 MHz to 20 MHz. According to some such implementations, a frequency range that includes the local ultrasonic wave transmission maximum caused by the resonator 250a may correspond with a frequency range that includes a local ultrasonic wave transmission maximum caused by the resonator 250c.

In this implementation, the display cover layer 203 forms a resonator 250b. According to some examples, the frequencies for maximum transmission of ultrasonic waves through the resonator 250b may be outside of (e.g., below) the frequency range that includes the local maxima caused by the resonators 250a and 250c. In some examples, the thickness of the resonator 250b may be less than a multiple N of a quarter wavelength at a peak frequency of an ultrasonic frequency range of ultrasonic waves transmitted by the ultrasonic sensor stack 105, where N is an integer greater than or equal to 1.

In this example, the display stiffener 113 forms the resonator 250d. According to this example, the resonator 250d causes a very low transmission of ultrasonic waves in the frequency range from 5 MHz to 15 MHz. The low transmission of ultrasonic waves caused by the display stiffener 113 represents a significant challenge for the design of under-display ultrasonic sensors.

Figure 3:
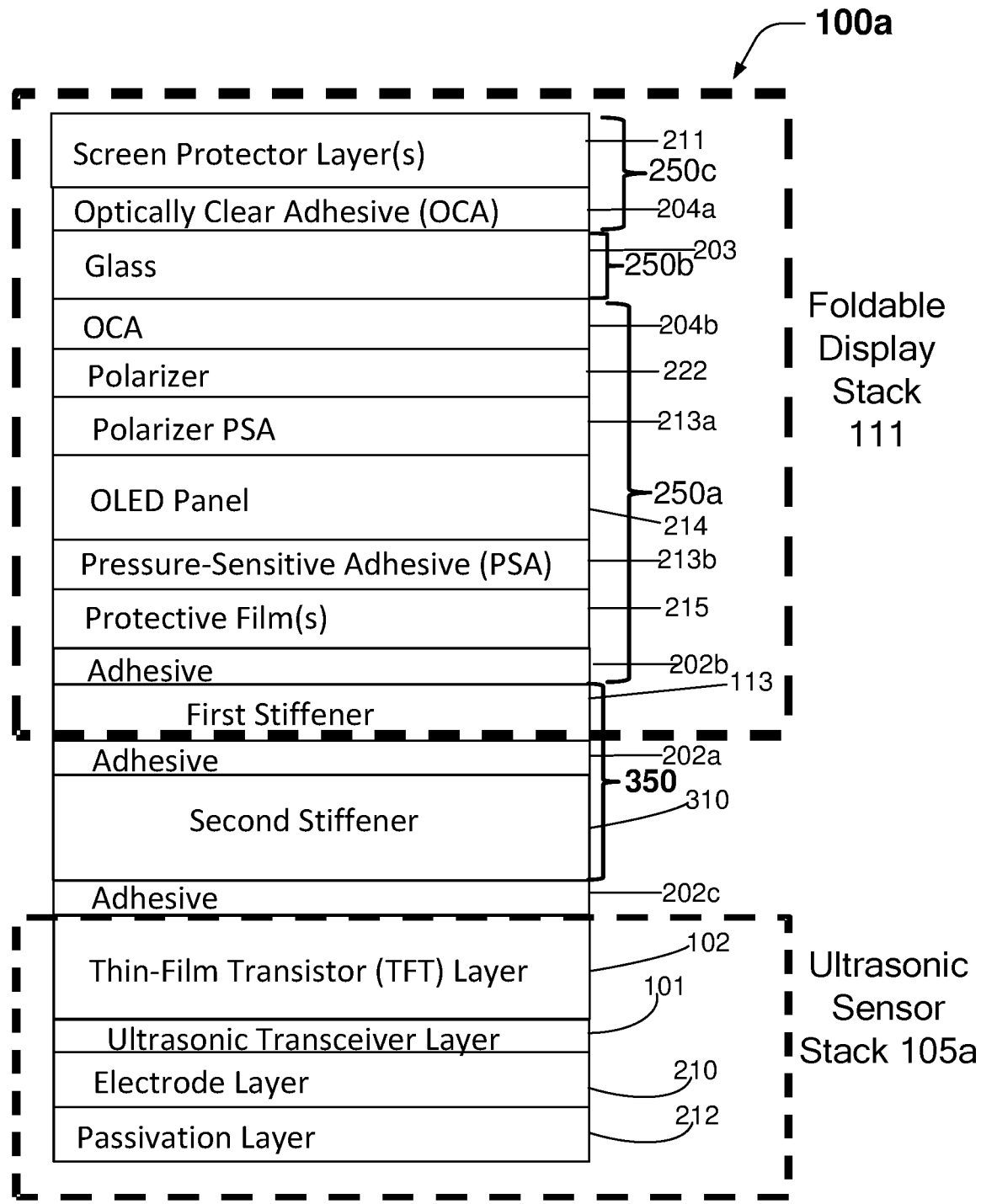
FIG. 3 shows a cross-sectional schematic view of an example apparatus including display layers of a foldable display stack, a multi-layer stiffener, and an ultrasonic sensor stack in a "receiver down" orientation according to some disclosed implementations.

FIG. 3 shows a cross-sectional schematic view of an example apparatus including display layers of a foldable display stack, a multi-layer stiffener, and an ultrasonic sensor stack in a "receiver down" orientation according to some disclosed implementations. As with other disclosed implementations, the types, number and arrangement of elements shown in FIG. 3 are merely examples. Other implementations may include different types, numbers and/or arrangements of elements. Moreover, the elements shown in FIG. 3 are not drawn to scale.

In this example the apparatus 100a is similar to the apparatus 200 shown in FIG. 2. However, in this implementation the apparatus 100a further includes an instance of a second stiffener 310 in addition to the display stiffener 113. For clarity, the display stiffener 113 is alternatively referred to as a first stiffener. The first stiffener 113, the second stiffener 310, and the adhesive layer 202a between the first stiffener 113 and the second stiffener 310 together form a multi-layer stiffener 350.

According to this example, the apparatus 100a includes instances of the ultrasonic sensor stack 105 and of the foldable display stack 111 of FIG. 1. The apparatus 100a includes the foldable display stack 111 and an ultrasonic sensor stack 105a in a "receiver down" orientation. In this example, the second stiffener 310 is attached to the foldable display stack 111 via an adhesive layer 202a. The ultrasonic sensor stack 105a is attached to the second stiffener 310 via an adhesive layer 202c. In some examples, the adhesive layers 202a and/or 202c may be, or may include, a pressure-sensitive adhesive. In some instances, the adhesive layers 202a and/or 202c may have a thickness in the range of 1 micron to 10 microns.

The ultrasonic sensor stack 105a is configured to transmit and receive ultrasonic waves, where the ultrasonic waves propagate and are reflected along an acoustic path. According to this example, the ultrasonic sensor stack 105a includes a TFT layer 102, an ultrasonic transceiver layer 101, and an electrode layer 210. The ultrasonic sensor stack 105a may further include a passivation layer 212. In this example of the "receiver down" orientation, the TFT layer 102 resides between the ultrasonic transceiver layer 101 and the foldable display stack 111. The TFT layer 102 is disposed over the ultrasonic transceiver layer 101 so that the TFT layer 102 is in the acoustic path. Here, the second stiffener 310 is attached to the TFT layer 102 via the adhesive layer 202c. The ultrasonic transceiver layer 101 is coupled to and underlying the TFT layer 102. The electrode layer 210 is coupled to and underlying the ultrasonic transceiver layer 101, and the passivation layer 212 is coupled to and underlying the electrode layer 210.

According to some implementations, the thickness of the TFT layer 102 may be in the range of 50 microns to 150 microns, e.g., 50 microns, 55 microns, 60 microns, 65 microns, 70 microns, 75 microns, 80 microns, 85 microns, 90 microns, 95 microns, 100 microns, 105 microns, 110 microns, 115 microns, 120 microns, 125 microns, 130 microns, 135 microns, 140 microns, 145 microns or 150 microns. In this example, the TFT layer 102 resides between the ultrasonic transceiver layer 101 and the foldable display stack 111. In some alternative implementations, the ultrasonic transceiver layer 101 may reside between the TFT layer 102 and the foldable display stack 111.

According to some examples, the ultrasonic transceiver layer 101 may be, or may include, one or more piezoelectric materials, such as a piezoelectric polymer and/or a piezoelectric copolymer. In some examples, the thickness of the ultrasonic transceiver layer 101 may be in the range of 5 microns to 20 microns, e.g., 5 microns, 6 microns, 7 microns, 8 microns, 9 microns, 10 microns, 11 microns, 12 microns, 13 microns, 14 microns, 15 microns, 16 microns, 17 microns, 18 microns, 19 microns, or 20 microns.

According to some implementations, the electrode layer 210 may be, or may include, a conductive ink (e.g., silver ink). However, in other implementations the electrode layer 210 may be, or may include, other types of conductors, such as copper, gold, etc. In some examples, the thickness of the electrode layer 210 may be in the range of 10 microns to 30 microns, e.g., 10 microns, 11 microns, 12 microns, 13 microns, 14 microns, 15 microns, 16 microns, 17 microns, 18 microns, 19 microns, 20 microns, 21 microns, 22 microns, 23 microns, 24 microns, 25 microns, 26 microns, 27 microns, 28 microns, 29 microns, or 30 microns.

In this instance, the ultrasonic sensor stack 105a includes a passivation layer 212. According to some examples, the passivation layer 212 may be, or may include, an epoxy film. In some examples, the passivation layer 212 may be in the range of 10 microns to 30 microns, e.g., 10 microns, 11 microns, 12 microns, 13 microns, 14 microns, 15 microns, 16 microns, 17 microns, 18 microns, 19 microns, 20 microns, 21 microns, 22 microns, 23 microns, 24 microns, 25 microns, 26 microns, 27 microns, 28 microns, 29 microns, or 30 microns.

The ultrasonic sensor stack 105a of the apparatus 100a is free of a foam backer or foam backing layer. In other words, the apparatus 100a is provided without a foam backer providing mechanical cushion or support for the ultrasonic sensor stack 105a. However, incorporation of the second stiffener 310 in the multi-layer stiffener 350 adds mechanical integrity and robustness to the apparatus 100a so that the foam backer is obviated.

In foldable display technologies, the presence of a foam backer reduces image quality and causes random image artifacts. Deformation caused by fingers or other target objects on foldable display technologies can lead to greater amounts of image distortion. During ultrasonic imaging (e.g., ultrasonic fingerprint imaging), a background image is obtained and a foreground image is obtained. A fingerprint image may be calculated by subtracting the background image from the foreground image. The background image may include the foam pattern caused by the foam backer. The background image is obtained prior to any object or finger deformation. The foreground image may include the fingerprint pattern plus a foam pattern upon deformation. Because of the flexible nature of foldable displays, such displays are easy to deform. As a result of deformation caused by pressing an object or finger against the foldable display, the background image that includes the undeformed foam pattern is now different than the foreground image that includes the deformed foam pattern. Thus, the presence of the foam backer, or any foam layer for that matter, leads to imaging distortions and air-in-capture issues. Inclusion of the second stiffener 310 in the multi-layer stiffener 350 mitigates the impact of deformation of a foldable display by removal of the foam backer and by increasing an overall stiffness of the foldable display.

The foldable display stack 111 includes the same layers that are described above with reference to FIG. 2. In this instance, the foldable display stack 111 includes a first stiffener 113 that resides between the second stiffener 310 and the other layers of the foldable display stack 111. In some examples, the first stiffener 113 may be, or may include, a high-impedance material such as metal. In some examples, the first stiffener 113 may have an acoustic impedance value greater than about 5.0 MRayls, greater than about 8.0 MRayls, or greater than about 10.0 MRayls. According to some implementations, the first stiffener 113 may include stainless steel. For instance, the stainless steel may have a thickness of about 30 microns, 80 microns, 100 microns, 120 microns, or 150 microns. According to some implementations, the first stiffener 113 may include aluminum. For example, the aluminum may have a thickness of about 150 microns or about 200 microns. According to some implementations, the first stiffener 113 may include titanium. In some cases, the titanium may have a thickness of about 120 microns or about 150 microns. According to some implementations, the first stiffener 113 may include a plastic material such as carbon fiber reinforced plastic (CFRP). The carbon fiber reinforced plastic may have a thickness of about 120 microns or about 150 microns. According to some implementations, the first stiffener 113 may include glass fiber reinforced plastic (GFRP). The glass fiber reinforced plastic may have a thickness of about 120 microns or about 150 microns. However, in other implementations the first stiffener 113 may be, or may include, one or more other metals, or non-metal material having a relatively high modulus of elasticity. For example, the first stiffener 113 may have a Young's modulus equal to or greater than about 10 GPa, equal to or greater than about 20 GPa, or equal to or greater than about 50 GPa. The first stiffener 113 may be, or may include, one or more metals or non-metal materials having a relatively low density. For instance, the first stiffener 113 may have a density equal to or less than about 20 g/cm$^3$, equal to or less than about 15 g/cm$^3$, or equal to or less than about 10 g/cm$^3$. In some examples, the first stiffener 113 may have a thickness in the range of 30 microns to 300 microns, e.g., 30 microns, 80 microns, 100 microns, 120 microns and 150 microns. Example materials and corresponding example thicknesses associated with the first stiffener 113 are shown in Table 1 below.

TABLE 1

Display Stiffener

| Material | Example Thickness Range (microns) |
| --- | --- |
| Stainless Steel | 30-150 |
| Aluminum | 100-300 |
| Titanium | 100-300 |
| CFRP | 100-300 |
| GFRP | 100-300 |

The second stiffener 310 is formed, positioned, located, or otherwise disposed between the foldable display stack 111 and the ultrasonic sensor stack 105a. As such, the second stiffener 310 is provided as an additional stiffener underlying the first stiffener 113 of the foldable display stack 111. The second stiffener 310 may also be referred to as an additional stiffener or device stiffener. Unlike the first stiffener 113, the second stiffener 310 is separate from the foldable display stack 111. Though the second stiffener 310 is shown as a single layer, it will be understood that the second stiffener 310 may include a plurality of layers.

In some examples, the second stiffener 310 may be, or may include, a high-impedance material such as a metal, a ceramic, or a glass. In some examples, the second stiffener 310 may have an acoustic impedance value greater than about 5.0 MRayls, greater than about 8.0 MRayls, or greater than about 10.0 MRayls. According to some implementations, the second stiffener 310 may include a metal such as aluminum, stainless steel, titanium, nickel, copper or alloys thereof. For instance, the second stiffener 310 may include aluminum. According to some implementations, the second stiffener 310 includes a ceramic such as aluminum oxide, silicon carbide, silicon nitride, boron carbide, aluminum nitride, or combinations thereof. For example, the second stiffener 310 may include aluminum oxide. According to some implementations, the second stiffener 310 may include a glass such as quartz, borosilicate glass, aluminosilicate glass, soda lime glass, or ultra-thin glass (UTG). Examples of ultra-thin glasses include but are not limited to Willow® glass manufactured by Corning Incorporated of New York, G-Leaf™ glass manufactured by Nippon Electric Glass of Japan, and Schott glass manufactured by Schott AG of Germany. In some implementations, the second stiffener 310 may include a glass ceramic such as lithium-alumina-silicon (LAS) glass ceramic, magnesium-aluminum-silicate (MAS) glass ceramic, and zinc-aluminum-silicate (ZAS) glass ceramic. The second stiffener 310 may be, or may include, one or more metals or non-metal materials having a relatively high modulus of elasticity. For example, the second stiffener 310 may have a Young's modulus equal to or greater than about 10 GPa, equal to or greater than about 20 GPa, or equal to or greater than about 50 GPa. The second stiffener 310 may be, or may include, one or more metals or non-metal materials having a relatively low density. For example, the second stiffener 310 may have a density equal to or less than about 20 g/cm$^3$, equal to or less than about 15 g/cm$^3$, or equal to or less than about 10 g/cm$^3$. In some implementations, the second stiffener 310 may include a plastic such as polyethylene terephthalate (PET). In some examples, the second stiffener 310 may have a thickness in the range of 30 microns to 300 microns, e.g., 30 microns, 35 microns, 40 microns, 45 microns, 50 microns, 55 microns, 60 microns, 65 microns, 70 microns, 75 microns, 80 microns, microns, 90 microns, 95 microns, 100 microns, 105 microns, 110 microns, 115 microns, 120 microns, 125 microns, 130 microns, 135 microns, 140 microns, 145 microns, 150 microns, 155 microns, 160 microns, 165 microns, 170 microns, 175 microns, 180 microns, 185 microns, 190 microns, 195 microns, 200 microns, 205 microns, 210 microns, 215 microns, 220 microns, 225 microns, 230 microns, 235 microns, 240 microns, 245 microns, 250 microns, 255 microns, 260 microns, 265 microns, 270 microns, 275 microns, 280 microns, 285 microns, 290 microns, 295 microns, or 300 microns. Example materials and corresponding example thicknesses associated with the second stiffener 310 are shown in Table 2 below.

TABLE 2

| Second Stiffener | |
|---|---|
| Material | Example Thickness Range (microns) |
| Stainless Steel | 30-150 |
| Aluminum | 100-300 |
| Titanium | 100-300 |

TABLE 2-continued

| Second Stiffener | |
|---|---|
| Material | Example Thickness Range (microns) |
| Nickel | 30-300 |
| Copper | 30-300 |
| Aluminum Oxide | 30-300 |
| Silicon Carbide | 30-300 |
| Silicon Nitride | 30-300 |
| Boron Carbide | 30-300 |
| Aluminum Nitride | 30-300 |
| Quartz | 30-300 |
| Borosilicate Glass | 30-300 |
| Ultra-Thin Glass | –30-300 |
| Lithium-Alumina-Silicon Glass Ceramic | 30-300 |
| Magnesium-Aluminum-Silicate Glass Ceramic | 30-300 |
| Zinc-Aluminum-Silicate GlassC eramic | 30-300 |

An adhesive layer 202a is formed, positioned, located, or otherwise disposed between the first stiffener 113 and the second stiffener 310 of the multi-layer stiffener 350. The adhesive layer 202a may be, or may include, a low-impedance material (in other words, a material having a low acoustic impedance) such as a pressure-sensitive adhesive. In some implementations, an acoustic impedance value of the adhesive layer 202a may be substantially different than the acoustic impedance value of the first stiffener 113 and the acoustic impedance value of the second stiffener 310. As used herein, the term "substantially different" with respect to acoustic impedance throughout this disclosure refers to an acoustic impedance value that is at least five times greater or five times less than an acoustic impedance of an adjacent surrounding material. Here, the adhesive layer 202a may have an acoustic impedance value that is at least five times less than either the first stiffener 113 or the second stiffener 310. The adhesive layer 202a provides an acoustic impedance mismatch between surrounding materials. In some implementations, the adhesive layer 202a has a thickness between about 1 micron and about 10 microns.

The first stiffener 113, the adhesive layer 202a, and the second stiffener 310 collectively form the multi-layer stiffener 350 that serves as an acoustic resonator. As an acoustic resonator, the multi-layer stiffener 350 is configured to enhance the ultrasonic waves transmitted by the ultrasonic sensor stack 105a in an ultrasonic frequency range. Although each of the first stiffener 113 and the second stiffener 310 alone causes a very low transmission of ultrasonic waves in the frequency range from 5 MHz to 15 MHz, the multi-layer stiffener 350 acts as a resonator that amplifies transmission of ultrasonic waves. In some instances, the multi-layer stiffener 350 is configured to cause ultrasonic waves transmitted by the ultrasonic sensor stack 105a to have a local amplitude maximum in the ultrasonic frequency range. The local amplitude maximum may correspond to a frequency in the range of 1 MHz to 20 MHz. In some examples, the multi-layer stiffener 350 may have a thickness corresponding to a multiple of a half wavelength of a shear wave or a longitudinal wave having a frequency in the ultrasonic frequency range. Hence, the presence of the multi-layer stiffener 350 in the apparatus 100a increases an overall acoustic performance of ultrasonic imaging.

The multi-layer stiffener 350 in the apparatus 100a provides an additional stiffener (that is in addition to the display stiffener) that increases an overall stiffness of the apparatus 100a. Due to its flexible nature, foldable displays are prone to image distortions and random image artifacts caused by mechanical deformation and changes in temperature. Multiple stiffeners further support the foldable display stack 111 and mitigate the effects of mechanical deformation on the foldable display stack 111. This reduces image distortions and random image artifacts, thereby improving image capture quality and display reliability.

The multi-layer stiffener 350 eliminates or reduces sensor marks. Attaching, laminating, or otherwise bonding a sensor stack (e.g., ultrasonic sensor stack 105a) to a display stack (e.g., foldable display stack 111) can induce mechanical stresses or strains in the sensor stack and/or display stack. These induced mechanical stresses and strains create cosmetic defects that can adversely affect display appearance and performance. The multi-layer stiffener 350 that includes the second stiffener 310 serves as a mechanical stress/strain isolation layer. As a mechanical stress/strain isolation layer, the second stiffener 310 is selected with a material and thickness that limits the transference of stress/strain between the ultrasonic sensor stack 105a and the foldable display stack 111 upon attachment, lamination, or bonding. Specifically, the second stiffener 310 is configured to reduce mechanical stress and strain in one or both of the ultrasonic sensor stack 105a and the foldable display stack 111. Thus, cosmetics defects and sensor marks that otherwise result from bonding the ultrasonic sensor stack 105a to the foldable display stack 111 are minimized with the multi-layer stiffener 350.

An adhesive layer 202c is formed, positioned, located, or otherwise disposed between the second stiffener 310 and the ultrasonic sensor stack 105a. The ultrasonic sensor stack 105a is attached to the second stiffener 310 by the adhesive layer 202c. In the "receiver down" orientation as shown in FIG. 3, the TFT layer 102 of the ultrasonic sensor stack 105a is attached to the second stiffener 310 by the adhesive layer 202c. In some implementations, the adhesive layer 202c is a pressure-sensitive adhesive. In some implementations, the adhesive layer 202c has a thickness between about 1 micron and about 10 microns.

Figure 4:
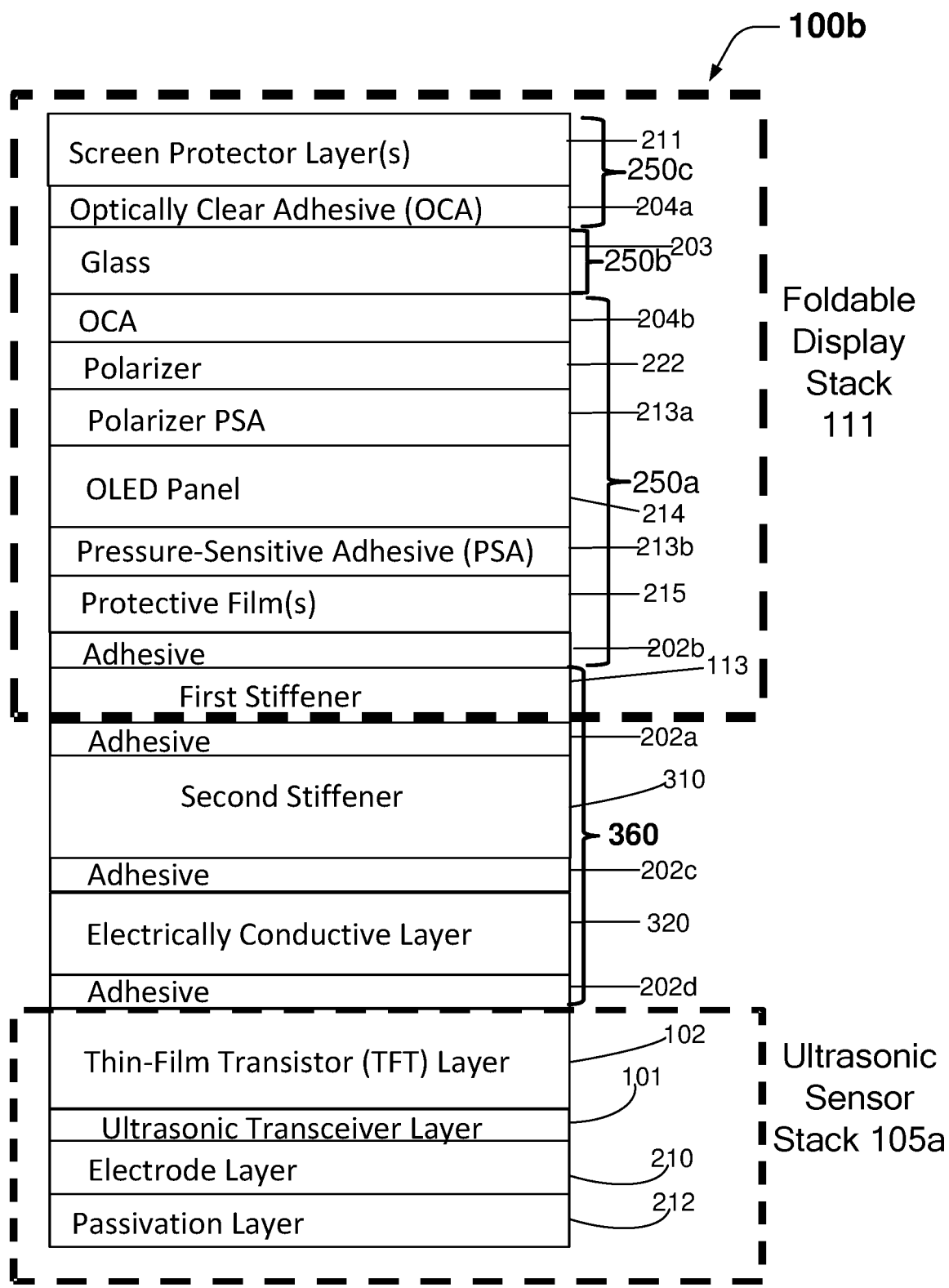
FIG. 4 shows a cross-sectional schematic view of an example apparatus including display layers of a foldable display stack, a multi-layer stiffener, an electrically conductive layer, and an ultrasonic sensor stack according to some disclosed implementations.

FIG. 4 shows a cross-sectional schematic view of an example apparatus including display layers of a foldable display stack, a multi-layer stiffener, an electrically conductive layer, and an ultrasonic sensor stack according to some disclosed implementations. As with other disclosed implementations, the types, number and arrangement of elements shown in FIG. 4 are merely examples. Other implementations may include different types, numbers and/or arrangements of elements. Moreover, the elements shown in FIG. 4 are not drawn to scale.

In this example the apparatus 100b is similar to the apparatus 100a shown in FIG. 3, because in this implementation the apparatus 100b includes an instance of the second stiffener 310 that is described above. As with the example of the apparatus 100a that is described above with reference to FIG. 3, the apparatus 100b also includes instances of the ultrasonic sensor stack 105a and of the foldable display stack 111 of FIG. 1. As in the example that is described above with reference to FIG. 3, in this example the second stiffener 310 is attached to the foldable display stack 111 via an adhesive layer 202a and an ultrasonic sensor stack 105b is attached to the second stiffener 310 via an adhesive layer 202c. In some examples, the adhesive layers 202a and/or 202c may be, or may include, a pressure-sensitive adhesive. In some instances, the adhesive layers 202a and/or 202c may be in the range of 1 micron to 10 microns.

According to the example of FIG. 4, an electrically conductive layer 320 is formed, positioned, located, or otherwise disposed between the TFT layer 102 and the second stiffener 310. The electrically conductive layer 320 may include an electrically conductive material such as a metal or metal coating. In some instances, the electrically conductive layer 320 may include copper and, more particularly, thick copper tape. In some other instances, the electrically conductive layer 320 may include aluminum tape or thick stainless steel tape. In some implementations, the electrically conductive layer 320 may have a thickness between about 10 microns and about 200 microns or between about 20 microns and about 100 microns, e.g., 20 microns, 25 microns, 30 microns, 35 microns, 40 microns, 45 microns, 50 microns, 55 microns, 60 microns, 65 microns, 70 microns, 75 microns, 80 microns, 85 microns, 90 microns, 95 microns, or 100 microns.

The electrically conductive layer 320 may function as an electrical shielding layer positioned between the ultrasonic sensor stack 105a and the foldable display stack 111. The electrical shielding layer may provide an electrical or electromagnetic barrier or electromagnetic interference shield from other electrical components. In addition, the electrical shielding layer may serve a thermal function by providing heat dissipation and improved temperature uniformity at a back of a display.

The electrically conductive layer 320 may be composed of a high-impedance material. In some implementations, the electrically conductive layer 320 may have an acoustic impedance value greater than about 5.0 MRayls, greater than about 8.0 MRayls, or greater than about 10.0 MRayls. The electrically conductive layer 320 is positioned between the adhesive layer 202c and an adhesive layer 202d. The electrically conductive layer 320 is attached to the second stiffener 310 via the adhesive layer 202c, and the electrically conductive layer 320 is attached to the TFT layer 102 via the adhesive layer 202d. In some examples, the adhesive layers 202c and/or 202d may be, or may include, a pressure-sensitive adhesive. That way, the high-impedance material of the electrically conductive layer 320 may be sandwiched between low-impedance materials.

Inclusion of the electrically conductive layer 320, the adhesive layer 202d, and the adhesive layer 202c further enhances the ultrasonic waves transmitted by the ultrasonic sensor stack 105a. As discussed above, the first stiffener 113, the adhesive layer 202a, and the second stiffener 310 together form the multi-layer stiffener 350 for increased stiffness. With the addition of the electrically conductive layer 320, an acoustic resonator 360 is formed by the first stiffener 113, the adhesive layer 202a, the second stiffener 310, the adhesive layer 202c, the electrically conductive layer 320, and the adhesive layer 202d. The acoustic resonator 360 is configured to enhance the ultrasonic waves transmitted by the ultrasonic sensor stack 105a in an ultrasonic frequency range. In some such implementations, the acoustic resonator 360 may cause a local maximum within the ultrasonic frequency range. According to some examples, the local maximum may correspond to a frequency in the range from 5 MHz to 15 MHz, or from 1 MHz to 20 MHz. Although the multi-layer stiffener 350 may amplify ultrasonic waves transmitted by the ultrasonic sensor stack 105a in the ultrasonic frequency range, the addition of the electrically conductive layer 320 sandwiched between the adhesive layers 202c and 202d further amplifies the ultrasonic waves transmitted by the ultrasonic sensor stack 105a in the ultrasonic frequency range. In some examples, the acoustic resonator 360 including the electrically conductive layer 320 may have a thickness corresponding to a multiple of a half wavelength of a shear wave or a longitudinal wave having a frequency in the ultrasonic frequency range. Thus, the electrically conductive layer 320 with the multi-layer stiffener 350 forms the acoustic resonator 360 in the apparatus 100b that increases an overall acoustic performance of ultrasonic imaging.

Figure 5:
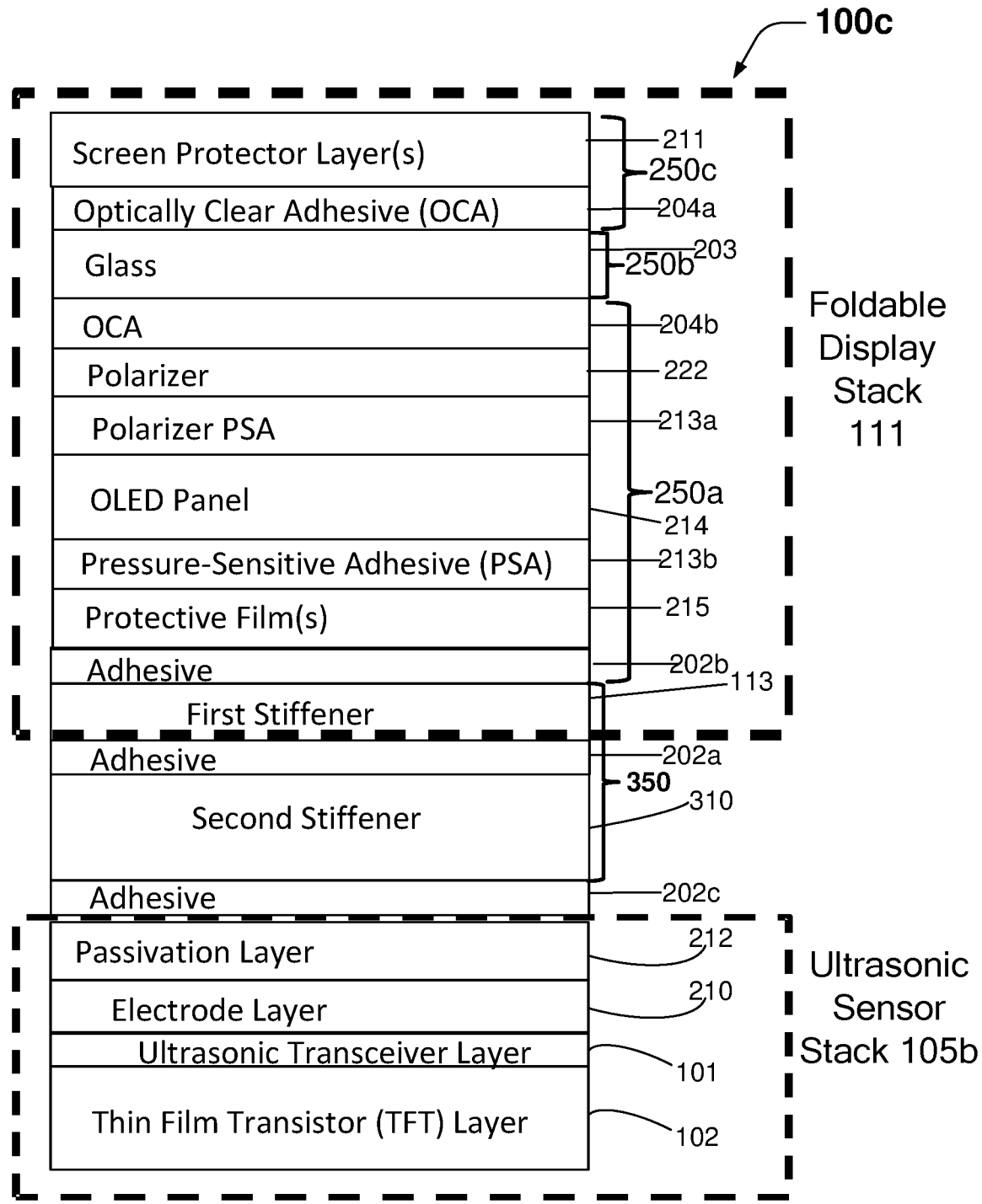
FIG. 5 shows a cross-sectional schematic view of an example apparatus including display layers of a foldable display stack, a multi-layer stiffener, and an ultrasonic sensor stack in a "receiver up" orientation according to some disclosed implementations.

FIG. 5 shows a cross-sectional schematic view of an example apparatus including display layers of a foldable display stack, a multi-layer stiffener, and an ultrasonic sensor stack in a "receiver up" orientation according to some disclosed implementations. As with other disclosed implementations, the types, number and arrangement of elements shown in FIG. 5 are merely examples. Other implementations may include different types, numbers and/or arrangements of elements. Furthermore, the elements shown in FIG. 5 are not drawn to scale.

In this example the apparatus 100c is similar to the apparatus 100a shown in FIG. 3, because in this implementation the apparatus 100c includes an instance of the second stiffener 310 that is described above. The apparatus 100c includes the foldable display stack 111 and an ultrasonic sensor stack 105b in a "receiver up" orientation. The second stiffener 310 is attached to the foldable display stack 111 via an adhesive layer 202a, and the ultrasonic sensor stack 105b is attached to the second stiffener 310 via an adhesive layer 202c. In some examples, the adhesive layers 202a and/or 202c may be, or may include, a pressure-sensitive adhesive. In some instances, the adhesive layers 202a and/or 202c may be in the range of 1 micron to 10 microns.

According to this example, the ultrasonic sensor stack 105b includes a TFT layer 102, an ultrasonic transceiver layer 101, and an electrode layer 210. The ultrasonic sensor stack 105b may further include a passivation layer 212. Unlike the implementation that is described above with reference to FIG. 3, the ultrasonic transceiver layer 101, the electrode layer 210 and the passivation layer 212 in FIG. 5 reside between the TFT layer 102 and second stiffener 310. In this example of the "receiver up" orientation, the ultrasonic transceiver layer 101 resides between the TFT layer 102 and the foldable display stack 111. The ultrasonic transceiver layer 101 is disposed over the TFT layer 102 so that the TFT layer 102 is not in an acoustic path. Instead, the electrode layer 210 and the passivation layer 212 are in the acoustic path. Here, the second stiffener 310 is attached to the passivation layer 212 of the ultrasonic sensor stack 105b via the adhesive layer 202c. The electrode layer 210 is coupled to and underlying the passivation layer 212. The ultrasonic transceiver layer 101 is coupled to and underlying the electrode layer 210, and the TFT layer 102 is coupled to and underlying the ultrasonic transceiver layer 101.

The first stiffener 113, the adhesive layer 202a, and the second stiffener 310 together form the multi-layer stiffener 350 that serves as an acoustic resonator. The acoustic resonator is configured to enhance the ultrasonic waves transmitted by the ultrasonic sensor stack 105b in an ultrasonic frequency range. Just as the multi-layer stiffener 350 amplifies transmission of ultrasonic waves with an ultrasonic sensor stack 105a in a "receiver down" orientation, the multi-layer stiffener 350 amplifies transmission of ultrasonic waves with an ultrasonic sensor stack 105b in a "receiver up" orientation. Accordingly, the presence of the multi-layer stiffener 350 in the apparatus 100c increases an overall acoustic performance of ultrasonic imaging. Similarly, the multi-layer stiffener 350 reduces sensor marks and reduces image distortions to improve display reliability in the apparatus 100c.

In some implementations, the apparatus 100c may further include an electrically conductive layer (not shown) between the second stiffener 310 and the ultrasonic sensor stack 105b. The electrically conductive layer may be sandwiched between the adhesive layer 202c and another adhesive layer (not shown). As discussed above, the electrically conductive layer such as copper may act as an electrical shielding layer and may further boost acoustic performance in the apparatus 100c.

Figure 6:
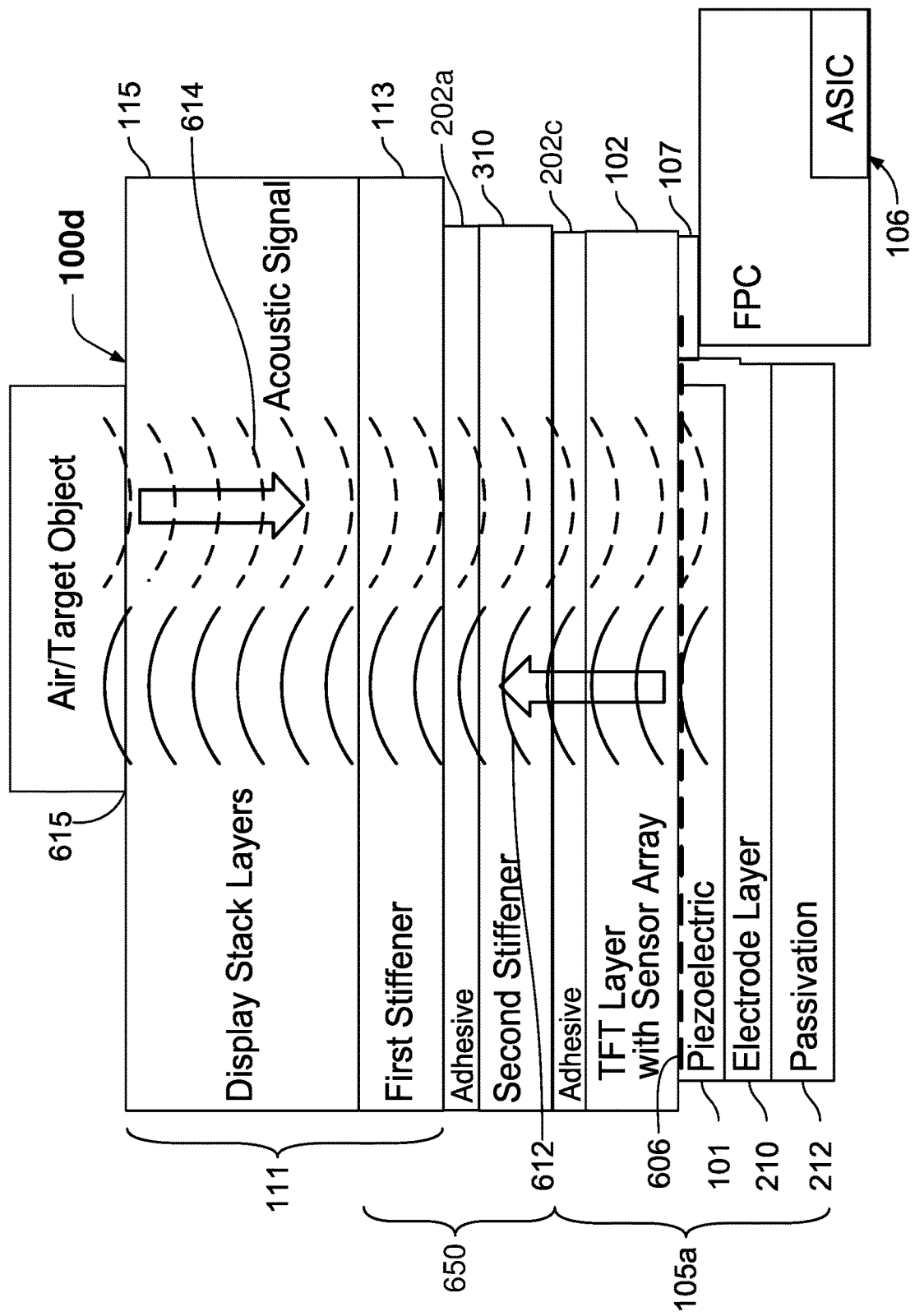
FIG. 6 shows a cross-sectional schematic view of an example apparatus including a foldable display and an under-display ultrasonic fingerprint sensor system according to some disclosed implementations.

FIG. 6 shows a cross-sectional schematic view of an example apparatus including a foldable display and an under-display ultrasonic fingerprint sensor system according to some disclosed implementations. As with other disclosed implementations, the types, number and arrangement of elements, as well as the dimensions of elements, are merely examples. According to this example, the apparatus 100d is configured to perform at least some of the methods disclosed herein. According to this implementation, the ultrasonic sensor stack 105a includes an ultrasonic transceiver layer 101, an electrode layer 210 on one side of the ultrasonic transceiver layer 101 and an array of sensor pixels 606 on a second and opposing side of the ultrasonic transceiver layer 101. In this implementation, the ultrasonic transceiver layer 101 includes one or more piezoelectric polymers. In other implementations, the ultrasonic transceiver layer 101 may include other types of piezoelectric materials.

According to this example, the electrode layer 210 resides between a passivation layer 212 and the ultrasonic transceiver layer 101. In some examples, the passivation layer 212 may include an adhesive, such as an epoxy film, a polymer layer (such as a polyethylene terephthalate (PET) layer), etc.

In this example the TFT layer 102 includes a TFT substrate and circuitry for the array of sensor pixels 606. The TFT layer 102 may be a type of metal—oxide—semiconductor field-effect transistor (MOSFET) made by depositing thin films of an active semiconductor layer as well as a dielectric layer and metallic contacts over a TFT substrate. In some examples, the TFT substrate may be a non-conductive material such as glass.

In this example, the apparatus 100d includes a foldable display stack 111, which includes a display stiffener 113 and display stack layers 115 in this instance. According to this example, the display stack layers 115 form one or more display stack resonators. In some instances, the one or more display stack resonators may be, or may include, the resonators 250a, 250b and/or 250c that are described above.

According to some examples, an acoustic resonator 650 includes the first stiffener 113 (display stiffener), the adhesive layer 202a, and the second stiffener 310. The acoustic resonator 650 may include the multi-layer stiffener 350 described above. The acoustic resonator 650 may further include an electrically conductive layer (not shown) such as copper sandwiched between the adhesive layer 202c and another adhesive layer (not shown). The acoustic resonator 650 may be configured to enhance the ultrasonic waves transmitted by the ultrasonic sensor stack 105a in at least one ultrasonic frequency range. In some implementations, the acoustic resonator 650 may also include the TFT layer 102 and the adhesive layer 202c. In some examples, the acoustic resonator 650 may cause a local maximum of ultrasonic wave transmission in at least one ultrasonic frequency range.

According to this implementation, the TFT layer 102, the array of sensor pixels 606, and the electrode layer 210 are electrically coupled to at least a portion of the control system 106 and one side of the ultrasonic transceiver layer 101 via a portion of the interface system 107, which includes electrically conducting material and a flexible printed circuit (FPC) in this instance.

In this example, the apparatus 100d is configured to perform at least some of the methods disclosed herein. In this example, the control system 106 is configured to control the ultrasonic sensor system to transmit one or more ultrasonic waves 612. According to this example, the ultrasonic waves 612 are transmitted through the TFT layer 102, the second stiffener 310, the first stiffener 113, and the display stack layers 115. According to this example, reflections 614 of the ultrasonic waves 612 are caused by acoustic impedance contrast at (or near) the interface 615 between the outer surface of the cover and whatever is in contact with the outer surface, which may be air or the surface of a target object, such as the ridges and valleys of a fingerprint, etc. (As used herein, the term "finger" may refer to any digit, including a thumb. Accordingly, a thumbprint will be considered a type of "fingerprint.").

According to some examples, reflections 614 of the ultrasonic wave(s) 612 may be detected by the array of sensor pixels 606. Corresponding ultrasonic signals may be provided to the control system 106. In some such implementations, ultrasonic signals that are used by the control system 106 for fingerprint-based authentication may be based on reflections 614 from a cover/finger interface that are detected by the array of sensor pixels 606. In some implementations, reflections 614 corresponding to a cover/air interface may be detected by the electrode layer 210 and corresponding background ultrasonic signals may be provided to the control system 106.

Figure 7:
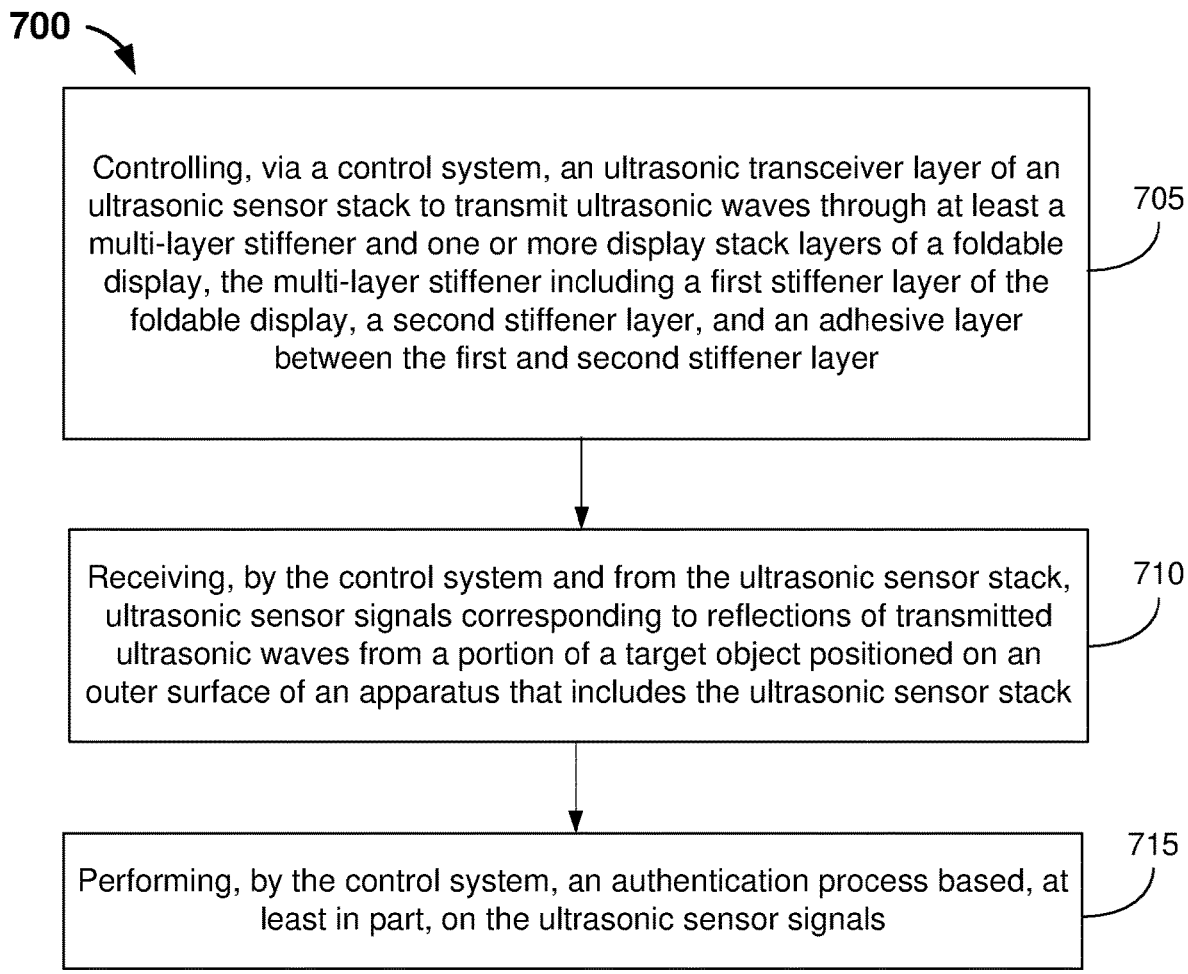
FIG. 7 shows a flow diagram of an example method of operating an apparatus for user authentication according to some disclosed implementations.

FIG. 7 shows a flow diagram of an example method of operating an apparatus according to some disclosed implementations. The blocks of FIG. 7 may, for example, be performed by the apparatus 100 of FIG. 1 (e.g., by the control system 106 and the ultrasonic sensor stack 105), or by a similar apparatus described in any one of FIGS. 3-6. As with other methods disclosed herein, the method outlined in FIG. 7 may include more or fewer blocks than indicated. Moreover, the blocks of methods disclosed herein are not necessarily performed in the order indicated. In some instances, one or more blocks may be performed concurrently.

In this example, block 705 of a process 700 involves controlling, via a control system (e.g., via the control system 106) an ultrasonic transceiver layer of an ultrasonic sensor stack (e.g., the ultrasonic transceiver layer 101) to transmit ultrasonic waves (e.g., the ultrasonic waves 612 shown in FIG. 6) through at least a multi-layer stiffener (e.g., the multi-layer stiffener 350) and one or more display stack layers (e.g., the display stack layers 115) of a foldable display (e.g., the foldable display stack 111). The multi-layer stiffener includes a first stiffener (e.g., the first stiffener 113) of the foldable display, a second stiffener layer (e.g., the second stiffener 310), and an adhesive layer (e.g., the adhesive layer 202a) between the first stiffener and the second stiffener.

In some implementations, each of the first stiffener and the second stiffener includes a material having a high modulus of elasticity, where each of the first stiffener and the second stiffener may have a Young's modulus equal to or greater than about 10 GPa, equal to or greater than about 20 GPa, or equal to or greater than about 50 GPa. In some implementations, each of the first stiffener and the second stiffener includes a material having a low density such as a density equal to or less than about 20 g/cm$^3$, equal to or less than about 15 g/cm$^3$, or equal to or less than about 10 g/cm$^3$.

In some implementations, the first stiffener includes a metal such as aluminum, titanium, stainless steel, or alloys thereof. In some implementations, the second stiffener includes a metal such as aluminum, stainless steel, titanium, nickel, copper, or alloys thereof In some implementations, the second stiffener includes a ceramic such as aluminum oxide, silicon carbide, silicon nitride, boron carbide, aluminum nitride, or combinations thereof In some implementations, the second stiffener includes a glass such as quartz, borosilicate glass, aluminosilicate glass, soda lime glass, and an ultra-thin glass. In some implementations, the second stiffener includes a glass ceramic such as LAS, MAS, or ZAS. In some implementations, the second stiffener includes a plastic.

In some implementations, each of the first stiffener and the second stiffener includes a high-impedance material, where the high-impedance material has an acoustic impedance value greater than about 8.0 MRayls. The adhesive layer between the first stiffener and the second stiffener may include a low-impedance material. The low-impedance material has an acoustic impedance value less than about 5.0 MRayls.

Although the second stiffener causes very low transmission of ultrasonic waves, an acoustic resonator formed by the stack of at least the first stiffener, the adhesive layer, and the second stiffener amplifies transmission of ultrasonic waves from an ultrasonic sensor stack. The acoustic resonator may cause a local maximum of ultrasonic wave transmission in an ultrasonic frequency range. In some implementations, the acoustic resonator may further include an electrically conductive layer such as copper that resides between the second stiffener and the ultrasonic sensor stack. The second stiffener, and optionally the electrically conductive layer, in the acoustic resonator boosts acoustic performance for improved ultrasonic imaging. The second stiffener also increases an overall stiffness of the apparatus that includes the foldable display, which reduces sensor marks and obviates a foam backer in the apparatus. Without the foam backer, air-in-capture defects are reduced or eliminated in the apparatus.

According to this implementation, block 710 of the process 700 involves receiving, by the control system and from the ultrasonic sensor stack, ultrasonic sensor signals corresponding to reflections of transmitted ultrasonic waves from a portion of a target object positioned on an outer surface of the apparatus that includes the ultrasonic sensor stack. According to some examples, the ultrasonic sensor signals may correspond to reflections from an interior of the portion of the target object. If the target object is a finger, the first signals may correspond to reflections of the first ultrasonic wave(s) from a subsurface of the finger, e.g., of reflections from one or more sub-epidermal features. Alternatively, or additionally, the ultrasonic sensor signals may correspond to reflections of the transmitted ultrasonic waves from a surface of the portion of the target object. If the target object is a finger, the ultrasonic sensor signals may correspond to reflections of the second ultrasonic wave(s) from a surface of the finger, e.g., from ridges and valleys of a fingerprint.

According to this implementation, block 715 of the process 700 involves performing, by the control system, an authentication process that is based, at least in part, on the ultrasonic sensor signals. In some implementations, the process 700 may involve controlling access to the apparatus, or to another device, based at least in part on the authentication process.

According to some implementations, block 715 may involve obtaining fingerprint data based on portions of the ultrasonic sensor signals received within a time interval corresponding with fingerprints. The time interval may, for example, be measured relative to a time at which the ultrasonic waves were transmitted. Obtaining the fingerprint data may, for example, involve extracting target object features from the ultrasonic sensor signals. The target object features may, for example, comprise fingerprint features. According to some examples, the fingerprint features may include fingerprint minutiae, keypoints and/or sweat pores. In some examples, the fingerprint features may include ridge ending information, ridge bifurcation information, short ridge information, ridge flow information, island information, spur information, delta information, core information, etc.

In some examples, block 715 may involve comparing the fingerprint features with fingerprint features of an authorized user. The fingerprint features of the authorized user may, for example, have been received during a previous enrollment process.

In some implementations, block 715 may involve extracting sub-epidermal features from the ultrasonic sensor signals. Sub-epidermal features of the authorized user may, for example, have been received during a previous enrollment process. According to some implementations, the authentication process may involve comparing sub-epidermal features extracted from the ultrasonic sensor signals with sub-epidermal features of the authorized user.

In some such implementations, the sub-epidermal features may include sub-epidermal layer information corresponding to reflections of the ultrasonic waves received from the portion of the target object within a time interval corresponding with a sub-epidermal region. The sub-epidermal features may, for example, include dermis layer information corresponding to reflections of the second ultrasonic wave received from the portion of the target object. The dermis layer information may have been obtained within a time interval corresponding with a dermis layer. The authentication process may be based, at least in part, on the dermis layer information. Alternatively, or additionally, the sub-epidermal features may include information regarding other sub-epidermal layers, such as the papillary layer, the reticular layer, the subcutis, etc., any blood vessels, lymph vessels, sweat glands, hair follicles, hair papilla, fat lobules, etc., that may be present within such tissue layers, muscle tissue, bone material, etc.

Figure 8:
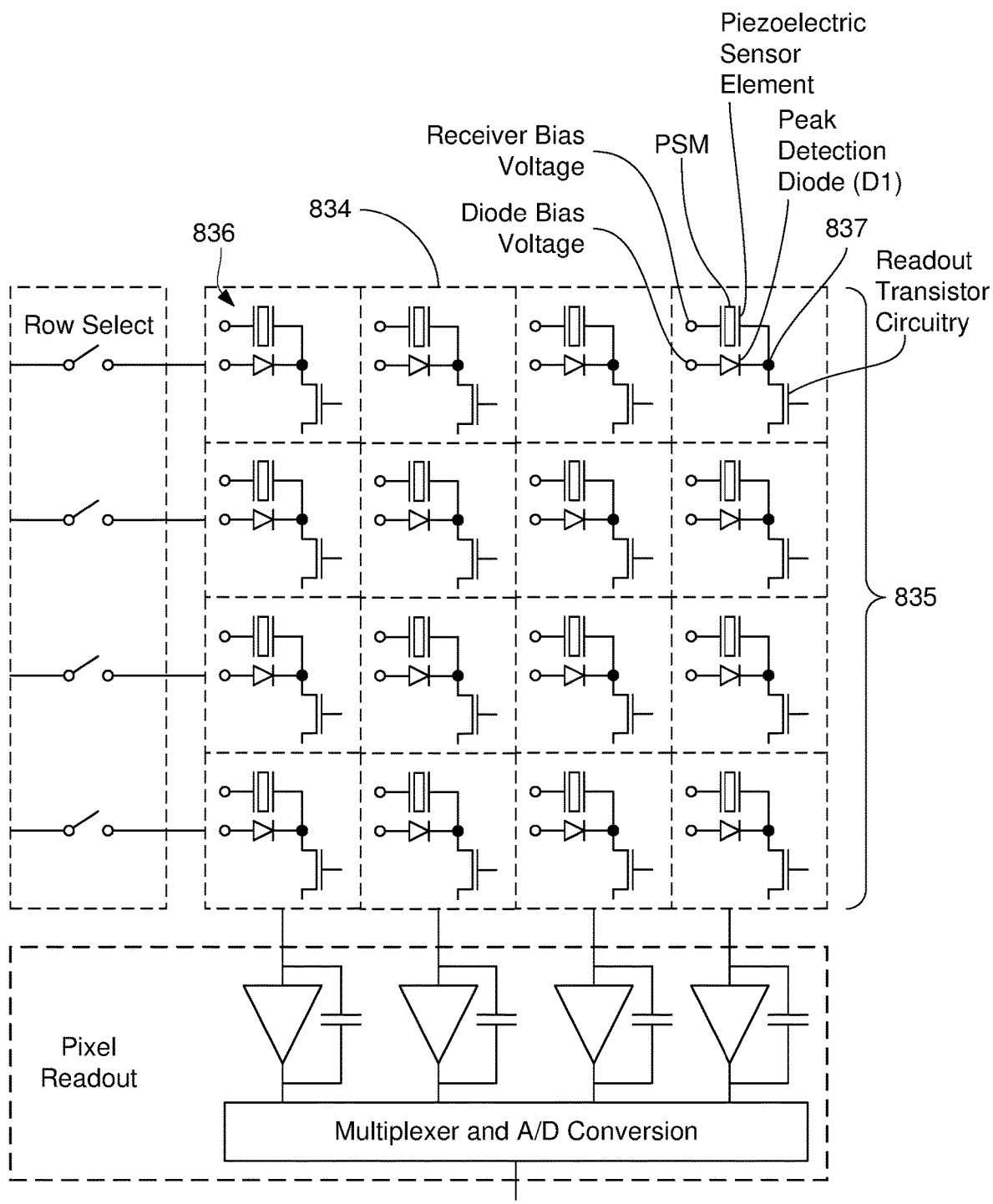
FIG. 8 representationally depicts aspects of a 4×4 pixel array of sensor pixels for an ultrasonic sensor system according to some disclosed implementations.

FIG. 8 representationally depicts aspects of a 4×4 pixel array of sensor pixels for an ultrasonic sensor system. Each pixel 834 may be, for example, associated with a local region of piezoelectric sensor material (PSM), a peak detection diode (D1) and a readout transistor (M3); many or all of these elements may be formed on or in a substrate to form the pixel circuit 836. In practice, the local region of piezoelectric sensor material of each pixel 834 may transduce received ultrasonic energy into electrical charges. The peak detection diode D1 may register the maximum amount of charge detected by the local region of piezoelectric sensor material PSM. Each row of the pixel array 835 may then be scanned, e.g., through a row select mechanism, a gate driver, or a shift register, and the readout transistor M3 for each column may be triggered to allow the magnitude of the peak charge for each pixel 834 to be read by additional circuitry, e.g., a multiplexer and an A/D converter. The pixel circuit 836 may include one or more TFTs to allow gating, addressing, and resetting of the pixel 834.

Each pixel circuit 836 may provide information about a small portion of the object detected by the ultrasonic sensor system. While, for convenience of illustration, the example shown in FIG. 8 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus comprising:
   an ultrasonic sensor stack configured to transmit and receive ultrasonic waves;
   a foldable display stack comprising a first stiffener;
   a second stiffener between the ultrasonic sensor stack and the foldable display stack; and
   a first adhesive layer between the second stiffener and the first stiffener, wherein an acoustic resonator is formed by at least the first stiffener, the second stiffener, and the first adhesive layer configured to amplify transmission of the ultrasonic waves transmitted by the ultrasonic sensor stack.

2. The apparatus of claim 1, wherein each of the first stiffener and the second stiffener has a Young's modulus greater than about 10 GPa.

3. The apparatus of claim 1, wherein each of the first stiffener and the second stiffener has an acoustic impedance value greater than about 8.0 MRayls.

4. The apparatus of claim 1, wherein the ultrasonic sensor stack comprises:
   a TFT layer having a substrate and an array of sensor pixels;
   an ultrasonic transceiver layer coupled to the TFT layer and comprising a piezoelectric material; and
   an electrode layer coupled to the ultrasonic transceiver layer.

5. The apparatus of claim 1, wherein the first stiffener comprises a metal or a plastic layer.

6. The apparatus of claim 1, wherein the second stiffener comprises a metal.

7. The apparatus of claim 6, wherein the metal is selected from a group consisting of:
   aluminum, stainless steel, titanium, nickel, and alloys thereof.

8. The apparatus of claim 1, wherein the second stiffener comprises glass.

9. The apparatus of claim 1, wherein the second stiffener comprises ceramic.

10. The apparatus of claim 9, wherein the second stiffener comprises aluminum oxide.

11. The apparatus of claim 1, wherein the second stiffener comprises a glass ceramic.

12. The apparatus of claim 1, wherein the second stiffener comprises a plastic.

13. The apparatus of claim 1, further comprising:
    an electrically conductive layer between the second stiffener and the ultrasonic sensor stack, wherein the acoustic resonator is formed by at least the first stiffener, the second stiffener, the first adhesive layer, and the electrically conductive layer.

14. The apparatus of claim 13, further comprising:
    a second adhesive layer between the electrically conductive layer and the second stiffener; and
    a third adhesive layer between the electrically conductive layer and the ultrasonic sensor stack.

15. The apparatus of claim 1, wherein the ultrasonic sensor stack is without any foam backer.

16. The apparatus of claim 1, wherein the second stiffener is configured to reduce mechanical stresses in the foldable display stack and the ultrasonic sensor stack.

17. An apparatus comprising:
- an ultrasonic sensor stack configured to transmit and receive ultrasonic waves;
- a foldable display stack comprising a first stiffener;
- a second stiffener between the ultrasonic sensor stack and the foldable display stack; and
- a first adhesive layer between the second stiffener and the first stiffener, wherein a multi-layer stiffener is formed by at least the first stiffener, the second stiffener, and the first adhesive layer, wherein each of the first stiffener and the second stiffener has a Young's modulus greater than about 10 GPa, and an acoustic impedance value of greater than about 8.0 MRayls.

18. The apparatus of claim 17, wherein the first stiffener comprises and metal and has a thickness in a range from 30 microns to 300 microns.

19. The apparatus of claim 17, wherein the second stiffener comprises a material selected from a group consisting of: a metal, a ceramic, a glass, and a glass ceramic.

20. A method comprising:
- controlling, via a control system, an ultrasonic transceiver layer of an ultrasonic sensor stack to transmit ultrasonic waves through at least a multi-layer stiffener and one or more display stack layers of a foldable display, the multi-layer stiffener including a first stiffener layer of the foldable display, a second stiffener layer, and an adhesive layer between the first and second stiffener layer;
- receiving, by the control system and from the ultrasonic sensor stack, ultrasonic sensor signals corresponding to reflections of transmitted ultrasonic waves from a portion of a target object positioned on an outer surface of an apparatus that includes the ultrasonic sensor stack; and
- performing, by the control system, an authentication process based, at least in part, on the ultrasonic sensor signals.

21. The method of claim 20, wherein a local maximum of ultrasonic wave transmission corresponds to a frequency in a range from 1 MHz to 20 MHz.

22. The method of claim 20, wherein the authentication process involves extracting target object features from the ultrasonic sensor signals.

23. The method of claim 22, wherein the target object features include at least one of fingerprint features or sub-epidermal features.

* * * * *